May 13, 1924.
A. R. ANGUS
1,494,206
RAILWAY SAFE RUNNING DEVICE
Filed Aug. 3, 1914
9 Sheets-Sheet 2

May 13, 1924.

A. R. ANGUS 1,494,206

RAILWAY SAFE RUNNING DEVICE

Filed Aug. 3, 1914   9 Sheets-Sheet 3

WITNESSES

BY

INVENTOR.
A.R.ANGUS

ATTY.

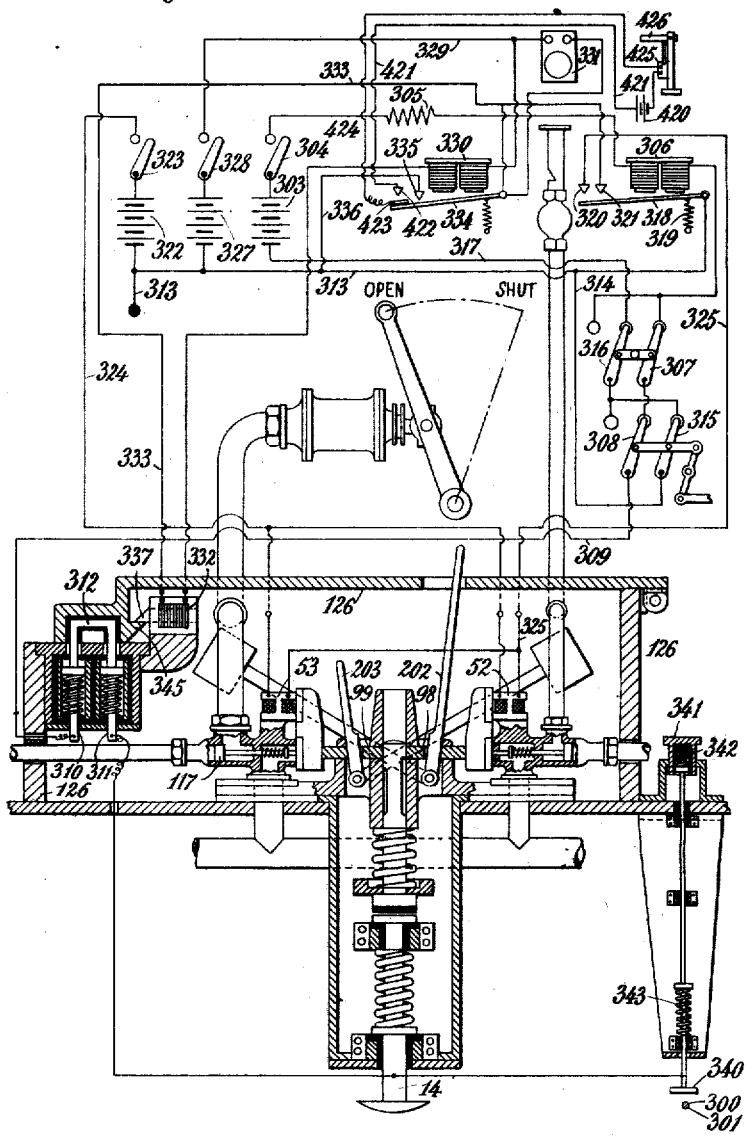

May 13, 1924.
A. R. ANGUS
1,494,206
RAILWAY SAFE RUNNING DEVICE
Filed Aug. 3, 1914
9 Sheets-Sheet 5
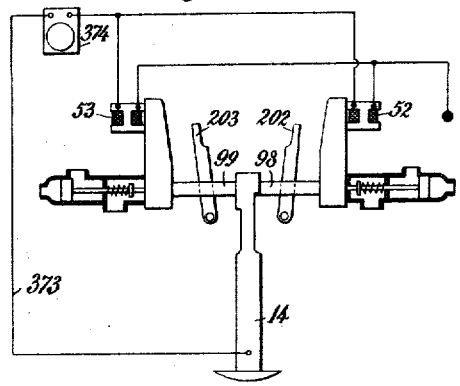
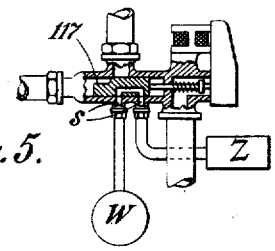
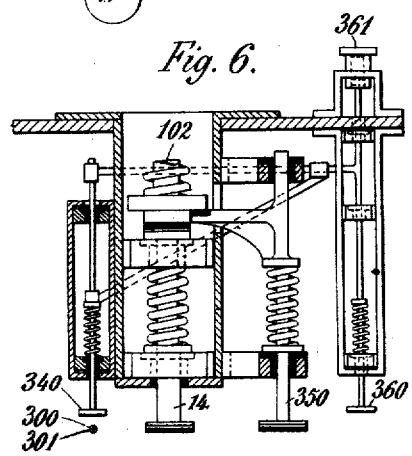

May 13, 1924.
A. R. ANGUS
1,494,206
RAILWAY SAFE RUNNING DEVICE
Filed Aug. 3, 1914   9 Sheets-Sheet 6
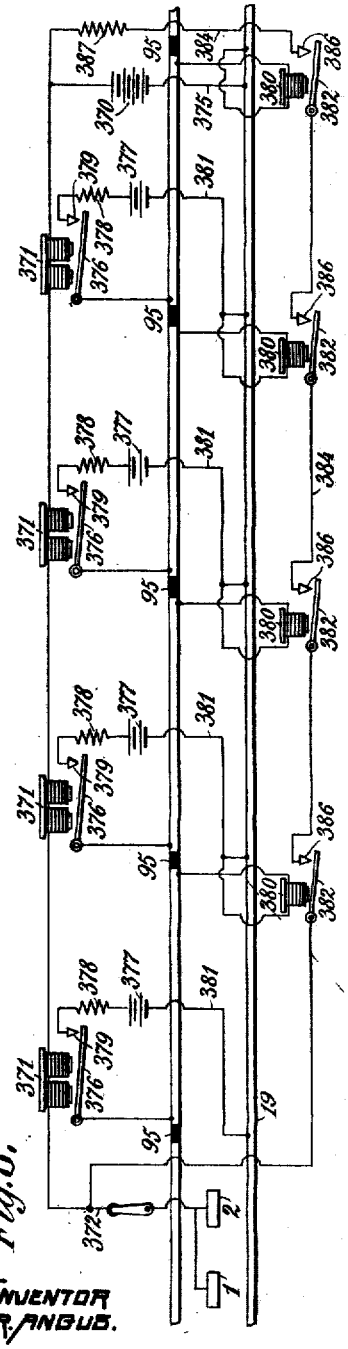

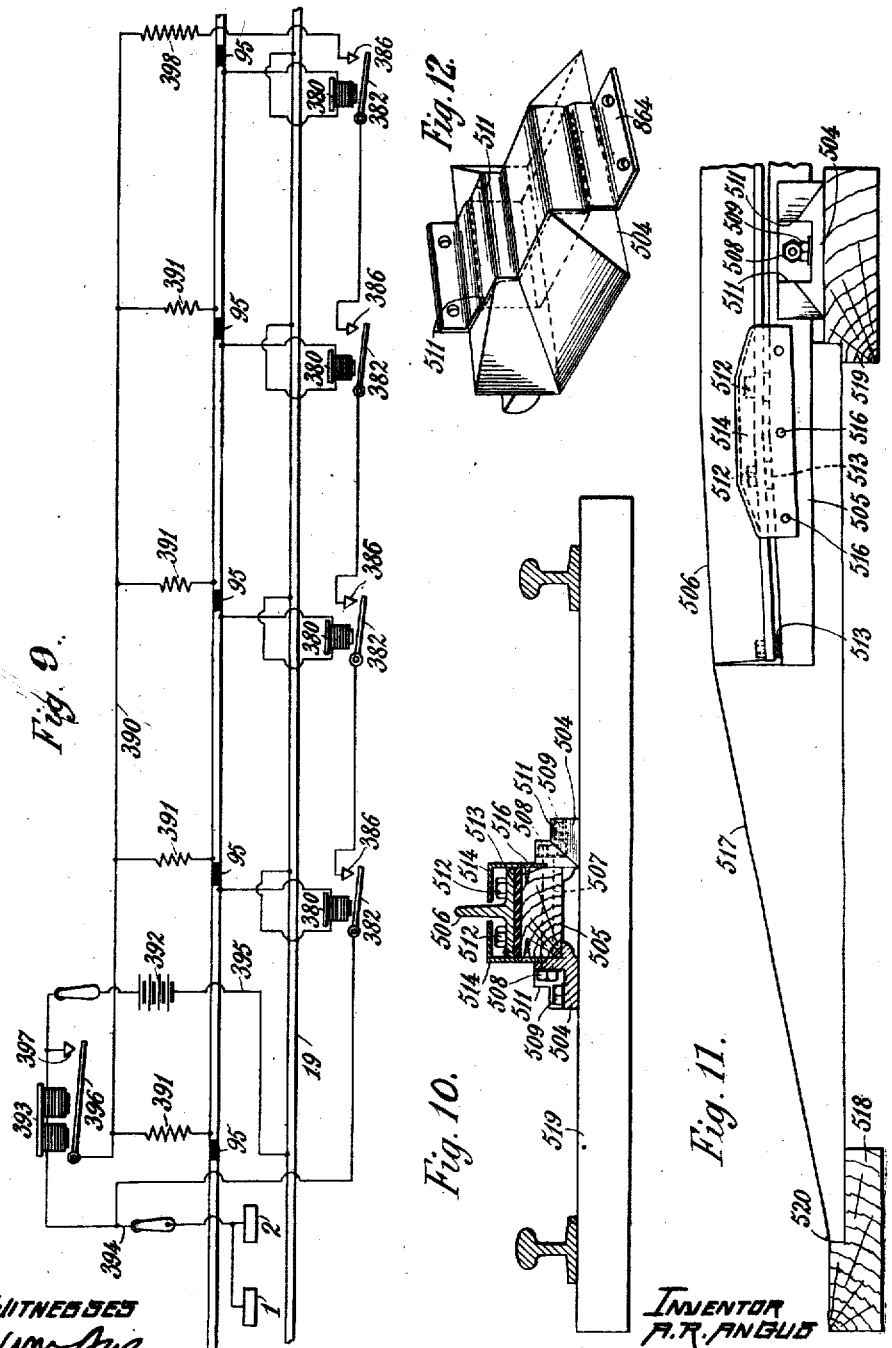

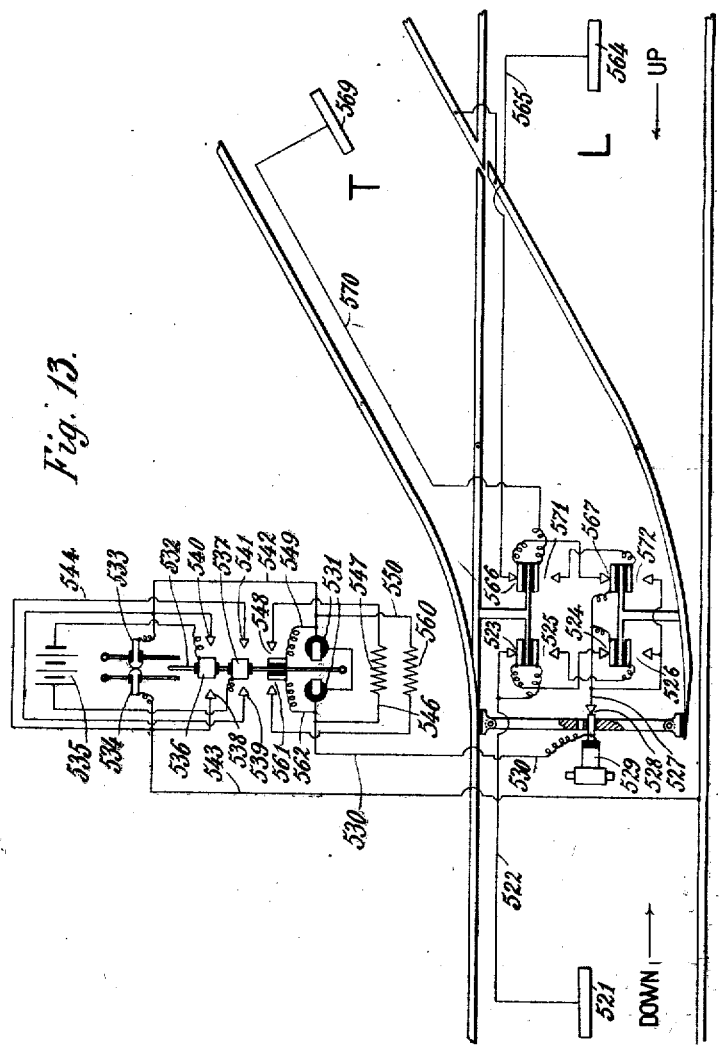

May 13, 1924.

A. R. ANGUS 1,494,206

RAILWAY SAFE RUNNING DEVICE

Filed Aug. 3, 1914 9 Sheets-Sheet 9

INVENTOR.
A. R. ANGUS

Patented May 13, 1924.

1,494,206

UNITED STATES PATENT OFFICE.

ARTHUR REGINALD ANGUS, OF MINEHEAD, ENGLAND.

RAILWAY SAFE-RUNNING DEVICE.

Application filed August 3, 1914. Serial No. 854,896.

(GRANTED UNDER THE PROVISIONS OF THE ACT OF MARCH 3, 1921, 41 STAT. L., 1313.)

*To all whom it may concern:*

Be it known that I, ARTHUR REGINALD ANGUS, a subject of the King of Great Britain, and resident of Tranmere, Tregonwell Road, Minehead, in the county of Somerset, England, solicitor, have invented a certain new and useful invention entitled Improvements in or Relating to Railway Safe-Running Devices, of which the following is a specification.

This invention relates to train protecting apparatus which is adapted to enable trains to protect themselves automatically and electrically and has for object to provide apparatus whereby a train will have a warning or stopping operation or a warning operation followed by a stopping operation or a service or emergency application of the brakes or a service application of the brakes followed by an emergency application of the brakes duly performed upon it in any of the following cases, notwithstanding either error such as hereinafter indicated on the part of an employee or failure such as hereinafter mentioned of parts of the apparatus: (*a*) whenever a section ahead of the train contains a displaced or broken rail; (*b*) whenever a section ahead of the train is occupied by another train or a railway vehicle; and (*c*) whenever points are unsafe for the train.

The invention comprises several features hereinafter defined and adapted to contribute to this result.

The invention is illustrated by the accompanying drawings which represent by way of example apparatus constructed and arranged in accordance therewith.

Fig. 4 is a diagrammatic representation of a modification of the train apparatus.

Fig. 5 is a diagrammatic representation of means for automatically disconnecting power from the brake-pump.

Fig. 6 is a diagrammatic representation of a modification of contacting apparatus on a locomotive.

Fig. 7 is a diagrammatic representation of apparatus on a locomotive intended to be used on tracks where trains run in one direction only.

Figs. 8 and 9 are diagrammatic representations of modifications of track apparatus for tracks whereon trains run in one direction only.

Figs. 10, 11 and 12 represent means for preventing a track contact from being caught or displaced by a coupling hook or hanging chain.

Figure 14:
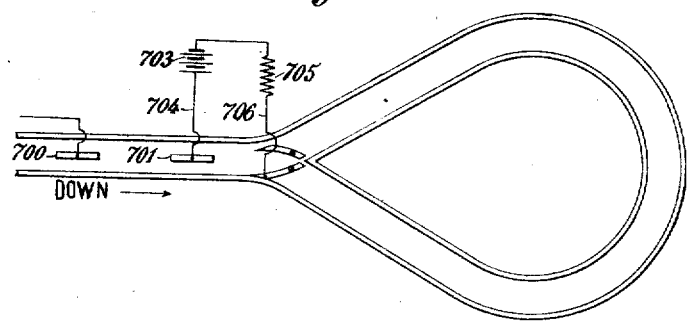

Fig. 13 represents diagrammatically apparatus on the track for preventing a train from passing over facing or trailing points unless they are safely home to make the one or the other road for a train and Fig. 14 is a diagrammatic representation of apparatus used in connexion with a loop turntable triangle or the like for compelling the driver of a train to change the connexions of the apparatus on the locomotive to suit the reversed direction of travel.

The railway tracks (Figs. 2, 3, 8 and 9) are divided into a series of sections each of which is hereinafter referred to as a "traffic section." The length of each traffic section is chosen according to the class of traffic which is to pass therethrough.

The rails constituting one side of the track are electrically bonded together from end to end of the track and the rails constituting the other side of the track are separated into suitable sections by insulating joints 95 to form suitably long traffic sections. Where necessary owing to the length of a section (Figs. 2, 3, 8 and 9) or to the fact that trains are to run in both directions along a track (Figs. 2 and 3) a section is divided by one or more insulating joints 95 into subsections. The length of a section or where it is subdivided the length of a subsection must not be greater than is suitable for the proper operation of a track relay connected to an electrically bonded length of track. The rails between each two consecutive joints 95 are electrically bonded together.

Figure 2:
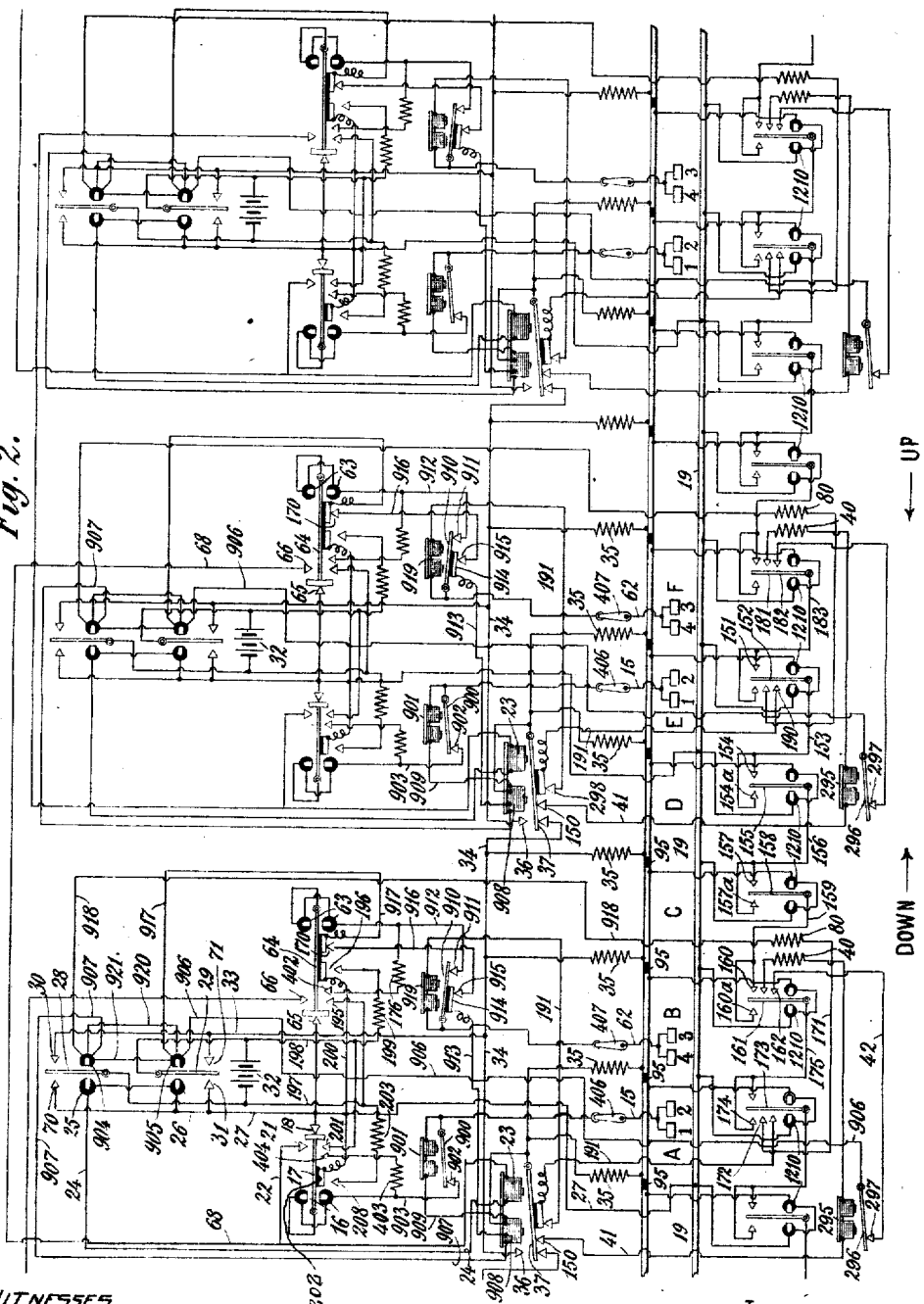
Fig. 2 is a diagrammatic representation of track apparatus adapted for a system wherein a train can run in both directions along a single track and wherein polarized relays are employed.

In the apparatus shown in Fig. 2 each subsection such as A, B, C, D, E, or F, has a polarized track relay 1210 connected across the rails in the known way. The track relays 1210 of the subsections are energized as hereinafter described by current flowing through suitable resistances 35 from a generator 32. This current however flows only when a train interacts with the track contacts relating to a traffic section which it seeks to enter.

In subsections such as A and E are placed track contacts 1 and 2 and in subsections such as F and B track contacts 3 and 4. The track contacts 1 and 3 are warning contacts i. e. they are adapted to displace a contacting device of a train in such a manner as to cause a warning operation unless otherwise restrained to be produced thereon and the track contacts 2 and 4 are stopping contacts i. e. they are adapted to displace the said contacting device in such a manner as to cause a stopping operation, unless otherwise restrained, to be produced on the train. The stopping contacts are intended to be placed at such a distance from the insulation which separates the subsections that any train can be stopped in the subsection A, E, F, or B before any portion of it reaches the next subsection.

When a train on the down journey (indicated in Fig. 2 by the word "Down" and an arrow) interacts with the track contacts 1 and 2 on subsection A, it tests the condition of the whole of the traffic section comprising the subsections B, C, D, E, and F, and obtains clearance if these are unoccupied by another vehicle and all is in order—for example, all connexions are intact and no rail is broken; otherwise it is warned by track contact 1 and if the driver pays no heed to the warning, it is stopped by track contact 2.

When a train on the up journey (indicated in Fig. 2 by the word "Up" and an arrow) interacts with the track contacts 3 and 4 on subsection F it tests the condition of the whole of the traffic section comprising the subsections E, D, C, B, and A and obtains clearance if these are unoccupied by another vehicle and all is in order: otherwise it is warned by track contact 3 and if the driver pays no heed to the warning it is automatically stopped by track contact 4.

The locomotive (Fig. 1) is equipped with a suitable contacting device or shoe 14 which, when displaced against springs 110 and 111 moves the slotted shaft 102 in a suitable guide 103 so as to remove its restraint on suitable dogs 98 and 99. When the shoe 14 makes contact with a warning contact such as 1 or 3 the movement of the shaft 102 is such that its restraint on the dog 98 only is removed. This dog unless then restrained by the action of the electromagnet comprising coils 52 on the armature 112 will at once be forced into the slot 100 owing to the action of fluid pressure on a piston 113 which by means of a piston rod 123 opens a door 124 which is fixed to the dog 98 and of a weight 108 on an arm 202 which is pivoted at 104. The piston 113 being forced out by the fluid pressure will admit fluid pressure to a pipe 114 and thence to a suitable danger whistle 115 which will thus be blown and give a danger intimation. At the same time the train pipe 400 will be connected to atmosphere through small orifices 500 and a gradual or service application of the brakes will be effected. When the shoe 14 interacts with a stopping contact such as 2 or 4 the shaft 102 is displaced to a greater extent so that its restraint both on the dog 98 and on the dog 99 is removed owing to the fact that the portion of the shaft 102 which normally abuts against the dog 99 is longer than the portion thereof which normally abuts against the dog 98. Unless restrained by the action of the electromagnet comprising coils 53 on armature 116 the dog 99 will then also be moved out by the action of fluid pressure on a piston 117 which by means of the piston rod 118 opens the door 119 which is fixed to the dog 99 and by the weight 109 acting on an arm 203 which is pivoted at 105.

Should the piston 117 be forced out by the fluid pressure acting on it, fluid pressure will be admitted by the pipe 120 to the cylinder 121 and the driver's regulator 122 will be forced over into the shut position. At the same time the main train pipe 400 is completely opened to the atmosphere, owing to the fact that the door 119 uncovers the large orifice which it normally keeps closed and the brakes on the train will thus be fully applied i. e. an emergency application of the brakes will take place.

When the dogs 98 and 99 are in their normal positions as shown, the pistons 113 and 117 are maintained in the positions shown by their piston rods 123 and 118 and the doors 124 and 119. Suitable springs may be placed on the piston rods 123 and 118, as shown normally tending to force out the doors 124 and 119.

The bottom of the shaft 102 rests in its normal position as shown on the top of the shoe 14. The shoe 14 is insulated from the shaft 102 and also from the rest of the frame of the locomotive.

The shoe 14 and the shaft 102 are loosely non-conductively connected by a link connexion, so that should the shoe 14 fall off or be displaced from its normal position it will pull the shaft 102 with it, and by thus freeing the dogs 98 and 99, cause the train to be warned and stopped.

The devices for re-setting the warning and stopping apparatus are enclosed in a suitable locked casing 126, through the side or top of which protrudes a suitable lever (which may as shown be an extension of the arm 202) for restoring into the position shown in the figure, the dog 98 after it has been forced out, thus stopping the sounding of the danger whistle 115; but the lever (which may as shown be an extension of the arm 203) for replacing the dog 99 into the position shown when this is forced out, cannot be operated unless the casing 126 is unlocked and opened or if preferred the lever for restoring the dog 99 can protrude through the casing and be locked on the outside.

In any case the key for unlocking the lever of the dog 99 can only be obtained from the guard on the train or some other suitable official so that when a train is automatically stopped it cannot proceed on its way without the assistance of the guard or some official other than the driver.

When a locomotive running on the down journey makes contact with a track contact 1 or 2 current will flow from a generator 5 (Fig. 1) through the arm 6 of commutator switches 6, 7, 56 and 60 (which are intended to be simultaneously moved when a locomotive changes its direction of running by means of a turntable triangle loop or the like) and the arm 8 of the reversing gear switches 8, 9 and 55 (adapted to be operated simultaneously by the reversing gear of the locomotive) resistance 10 the coils of the polarized relays 11 and 12 (the armatures of which are adapted normally to take up the middle position) wire 13 the shoe 14 to the track contact 1 or 2 (Fig. 2) wire 15 armature 900 of electromagnet 901 contact 902 wire 903 the coils of the polarized relay 16 its armature 17 (which is normally in contact only with contact 18) contact 18 wire 27 to the rails 19 and back to the generator 5 through the frame of the locomotive, wire 20 (Fig. 1) and the arms 9 and 7 of the reversing and commutator switches respectively. The direction of current through the coils of the polarized relay 16 is such as to cause the armature 17 to move into contact with contact 21 and to break contact with contact 18, the arrangement being such that contact between the armature 17 and the contact 21 is effected before contact with the contact 18 is broken. Current then flows by wire 22 to the electromagnet 23, wire 24, the coils of the electromagnets 25 and 26, wire 27, to the rails 19, and back to the generator 5 as before described.

The direction of the current through the coils of the magnets 25 and 26 is such that the armatures 28 and 29 which are polarized are moved to contact with the contacts 30 and 31 respectively thereby connecting the positive pole of a local generator 32, through armature 29, contact 31, wire 27, to the rails 19, and the negative pole through armature 28, contact 30, wire 33, to the main line wire 34, thus feeding, through suitable resistances 35, the six subsections A, B, C, D, E, and F, the connexion to subsections A and B being completed through contact 36 and the armature 37 of the electromagnet 23 pertaining to the subsections A and B which is now energized and the connection to subsections E and F being completed through contact 150 and armature 37 of electromagnets 23 and 908 pertaining to subsections E and F which are now unenergized. As the train is standing on subsection A the track relay of subsection A does not attract its armature 173 but the armatures of the track relays of the subsections B, C, D, E, and F are attracted so as to complete a parallel path from wire 34 through armature 37 (shown in Fig. 2 in subsection D), contact 150, wire 41, electromagnet 295, resistance 40, contact 181, armature 182 of the polarized relays of subsection F, wire 183, contact 151, armature 152 of the polarized relay of subsection E, wire 153, contact 154, armature 155 of the polarized relay of subsection D, wire 156, contact 157 armature 158 of the polarized relay of subsection C wire 159 contact 160 armature 161 of the polarized relay of subsection B contact 162 wire 42 contact 297 armature 296 wire 906 one winding of the electromagnet 905 wire 920 one winding of the electromagnet 904 wire 907 one winding of the electromagnet 908 wire 909 and electromagnet 901 to wire 15. Owing to the arrangement of the windings round the magnets 905 and 904 and the direction of the current therethrough the armatures 29 and 28 are maintained in contact with the contacts 31 and 30 respectively.

The electromagnet 901 being energized lifts the armature 900 from the contact 902 and thus breaks the circuit comprising the coils of the polarized relay 16 the electromagnet 23 and the electromagnets 25 and 26. Since however the electromagnets 904 and 905 and the electromagnet 908 are energized at the same time as the electromagnet 901 the armatures 28, 29 and 37 are maintained in contact with the contacts 30, 31, and 36 respectively.

The value of the resistance of the path through which the current now flows in relation to the supplying generators 5 (Fig. 1) and 32 (Fig. 2) is such that the current (regulated by the resistance 40) which flows through the resistance 40 and through the polarized relays 11 and 12 (Fig. 1) carried on the locomotive is of much greater value than the current which first passed through the relays 11 and 12 from the generator 5 and the resultant current through the polarized relays 11 and 12 is such that the armatures 43 and 44 are moved so that the armature 43 contacts with the contact 45 and the insulated contact plate 47 with the contact 46. The warning and stopping operations on the locomotive are then restrained by current flowing from the generator 50, through a bell or buzzer 51, the coils of the magnets 52 and 53, wire 54, the arm 55 of the reversing gear switches the arm 56 of the commutator switches, contact 46, insulated contact plate 47 on armature 44, wire 57, contact 45, armature 43, wire 58 to generator 50. The train thus obtains clearance over the track contacts 1 and 2, but should any of the subsections B, C, D, E, and F be occupied by a vehicle or should a rail be broken in any one of these subsections, the track relay of that subsection would not move its armature to complete the aforesaid parallel path through the resistance 40, and the initial current passing through the polarized relays 11 and 12 (which can be limited by the resistance 10) could not be sufficient to move the armatures 43 and 44 to complete the restraining circuit from the generator 50, and the train would thus be warned on track contact 1 and stopped on track contact 2.

When the locomotive is running on the up journey the arms 8, 9 and 55 (Fig. 1) of the reversing gear switches (or if the locomotive has changed its direction of running on a turntable triangle loop or the like the arms 6, 7, 56 and 60 of the commutator switches) are reversely placed so that the negative pole of the generator 5 is connected to the shoe 14 through the arm 7, the arm 8 (or arm 6 and arm 8) the resistance 10 the coils or polarized relays 11 and 12, and wire 13, and the positive pole to the frame through the arms 6 and 9 (or the arms 7 and 9). When the locomotive interacts with the track contact 3 or 4 of subsection F negative current flows from the generator 5 to the track contact 3 or 4 at F through wire 62 armature 910 contact 911 wire 912 the coils of a polarized relay 63 its armature 64 which is normally in contact with contact 65 contact 65 to the rails 19 and the armature 64 is moved to make contact with contact 66 before finally breaking contact with contact 65. The current then flows by wire 68 through the electromagnet 23 at the far end of the section wire 24 the electromagnets 25 and 26 to the rails 19 and as the current is in the direction opposite to that of the current that flows through the electromagnets 25 and 26 when a train travelling in the down direction makes contact with a track contact 1 and 2 of subsection A the armatures 28 and 29 are moved against the contacts 70 and 71 and the positive pole of the generator 32 is thus connected through armature 29 contact 71 wire 33 to the main line wire 34 and the negative pole of generator 32 through armature 28 contact 70 and wire 27 to the rails 19. The armature 37 is thus attracted against the contact 36 and the subsections A, B, C, D, E, and F are connected through the resistances 35 with the positive pole of the generator 32 instead of to the negative pole thereof as when the train running in the down direction came into contact with track contacts 1 and 2 in subsection A. The track relays of the subsections A, B, C, D, and E, are thus operated so as to complete a parallel path from line wire 34 through armature 37 the electromagnet 908 (the electromagnet 908 has two windings and the current now passes through the winding not traversed by current when a train travelling on the down journey interacts with a track 1 or 2 in subsection A) through wire 913 insulated contact 914 carried by armatures 910 adjacent to subsection B contact 915 wire 916 contacts 170 shown adjacent to subsection C (of which one is a spring contact and the other is carried by but insulated from the armature 64) wire 917 the electromagnet 905 wire 921 the electromagnets 904 (each of the electromagnets 904 and 905 has two windings and the current now passes through the windings not traversed by current when a train travelling on the down journey interacts with a track contact 1 or 2 in subsection A) wire 918 resistance 80 wire 171 contact 172 armature 173 of the polarized relay of subsection A contact 174 wire 162 armature 161 of the polarized relay of subsection B contact 160ª wire 159 armature 158 of the polarized relay of subsection C contact 157ª wire 156 armature 155 of the polarized relay of subsection D contact 154ª wire 153 armature 152 of the polarized relay of subsection E contact 190 two portions of wire 191 (joined by two contacts 298 of which one is carried by and insulated from the armature 37 of the magnet 23 shown in the figure as in subsection D) and the electromagnet 919 to wire 62 which is connected to the track contacts 3 and 4. Owing to the arrangement of the windings of the electromagnets 905 and 904 now traversed by current and the direction of the current therethrough the armatures 29 and 28 are maintained in contact with the contacts 71 and 70 respectively. The electromagnet 919 being energized lifts the armature 910 from the contacts 911 and thus breaks the circuit comprising the coils of the polarized relay 63 the electromagnet 23 and the electromagnets 25 and 26. Since however the electromagnets 904 and 905 and the electromagnet 908 are energized at the same time as the electromagnet 919 the armatures 28, 29 and 37 are maintained in contact with the contacts 70, 71 and 36 respectively. The current through the resistance 80 also passes through the coils of polarized relays 11 and 12 on the locomotive (in the direction opposite to that in which current flowed therethrough when the locomotive came into contact with track contacts 1 and 2 in subsection A) and owing to the relation between the resistance of the path through which the current now flows to the supplying generator 5 (Fig. 1) and 32 (Fig. 2) is of much greater value than that which at first passed (in the same direction through the polarized relays 11 and 12 from the generator 5. The resultant current through the coils of the relays 11 and 12 is such as to move the armatures 43 and 44 so that 43 contacts with the contact 85 and the insulated plate 86 with the contact 87. This completes the restraining circuit from the generator 50, through the bell or buzzer 51, the coils 53 and 52, wire 54, the arms 55 and 60 (or the arms 55 and 56) contacts 87 and 86, wire 88, contact 85, armature 43, and wire 58, and the warning and stopping operations are restrained. Had any of the subsections A, B, C, D, and E been occupied the circuit of the battery 32 through the resistance 80 would not have been completed through the coils of the relays 11 and 12, the armatures 43 and 44 would not have been moved to complete this restraining circuit and the train would have been warned and stopped on track contacts 3 and 4 respectively.

When a train travelling in one direction interacts with track contacts which control the safety of the train in the other direction it is necessary for it only to obtain clearance over them without testing the state of the tracks. Thus, for example, a train on the down journey having tested the state of the subsections B, C, D, E, F, when on track contacts 1 and 2 at A needs only to obtain clearance over the track contacts 4 and 3 at B which control the safety of a train on the up journey. The positive pole of the generator 5 being connected to the shoe 14 and thus to the track contacts 4 or 3 a circuit is completed from generator 5 through the locomotive apparatus thence to track contact 4 or 3 wire 62 armature 910 contact 911 wire 912 coils of polarized relay 63 armature 64 contact 65 to the rails 19. The direction of this initial current through the coils of relay 63 is such as to move the armature 64 against the contacts 195 and 402 contact of which is effected before that with 65 is finally broken and contact is simultaneously made between contacts 196 (of which one is carried by and insulated from the armature 64). Connexion is thus made between the armature 64 and the rails through contact 195 wire 197 negative pole of generator 32 wire 198 resistance 199 contacts 196 and wire 200. The generators 5 and 32 are thus placed in series and the strength of the current flowing through the coils of relays 11 and 12 on the locomotive is sufficient and in the proper direction to restrain the warning and stopping operations. The whole of this current does not pass through the coils of the relay 63, these being now shunted by the resistance 176 whose circuit is completed at contact 402. Similarly a train on the up journey on interacting with track contacts 1 and 2 at A moves the armature 17 against the contacts 201 and 404 and also makes contact between the contacts 202 (of which one is carried by and insulated from the armature 17) and contact 208 thus shunting the coils of the relay 16 by resistance 403, connecting the armature 17 to the positive pole of the generator 32, and cutting in the resistance 203, the result being that current of sufficient value flows in the proper direction through the locomotive apparatus to restrain the warning and stopping operations.

The value of the resistance 10 (Fig. 1) is such that should the shoe 14 short-circuit directly to the frame, the current passing from the generator 5 through the coils of the relays 11 and 12 would be small in value and not nearly sufficient to move the armatures 43 and 44 from their neutral middle positions so as to complete the connexions for effecting the restraint of the warning and stopping operations as aforesaid.

Figure 1:
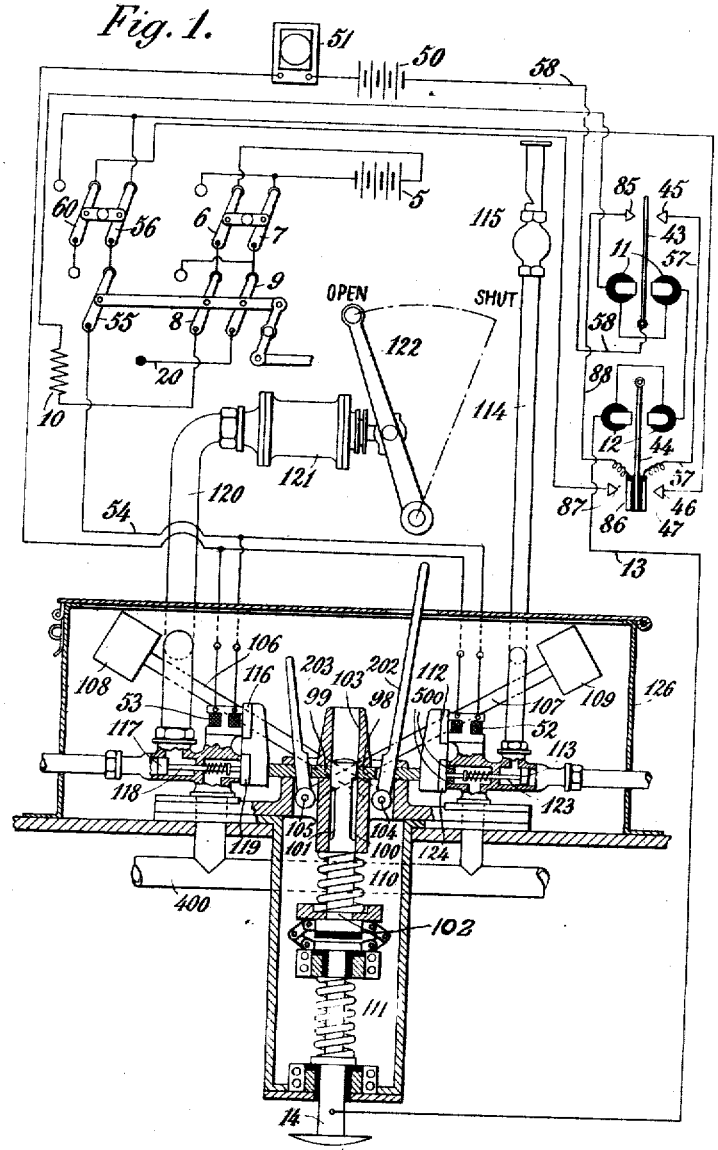
Fig. 1 is a diagrammatic representation of train apparatus.

Although only one polarized relay 11 or 12 with its armature 43 or 44 could be used on a locomotive, it is preferred, for the purpose of minimizing the risk of accidental improper restraint of warning and stopping operations, to employ, as shown in Fig. 1, two polarized relays 11 and 12 having armatures 43 and 44 respectively electrically threaded, or one polarized relay 11 or 12 having two armatures electrically threaded so that only when both armatures are correctly operated will a circuit for restraining warning and stopping operations be completed when contact is made with a track contact.

When a train runs in a particular direction and, owing to incorrect switching of the track apparatus, current from the generator 32 flows in the wrong direction for that direction of travel through the coils of the relays 11 and 12 on the locomotive, the aforesaid restraining circuit is not completed, owing to the fact that the armatures 43 and 44 are not brought into the positions corresponding to the setting of the arm 55 of the reversing gear switches or the arms 56 and 60 of the commutator switches or the setting of both and a warning or a stopping operation is consequently produced on the train as aforesaid.

Suitable switches 406 and 407 may be placed in the wires 15 and 62 respectively or similar switches may be placed in any other convenient conductors for the purpose of enabling a signalman to prevent the passage of a train along the railway track by breaking the connexions of the track contacts 1, 2, and 3, 4, with rails 19.

In the example of apparatus shown in Fig. 3 the track is again divided into sections and subsections in a manner similar to that shown in Fig. 2 but with the exception of the relays 216 and 261 which correspond to the relays 16 and 63 shown in Fig. 2 nonpolarized relays are employed instead of polarized relays. The subsections B, C, E, and F constitute a traffic section for the down journey of a train to be tested by it when in subsection A, and the subsections E, D, C, B, and A constitute a traffic section for the up journey of the train to be tested by it when in section F. It is evident that a traffic section may be composed of a number of subsections differing from that of the example shown.

In each subsection a nonpolarized track relay 210 connects the rails at one end of the subsection. Each of these relays is adapted to be energized by current which flows therethrough from a suitable generator 211 or 212 which sends current through the main line wire 213, through suitable resistances 214 through the rails of the subsection to the track relays 210. The disposition of the track contacts is the same as in Fig. 2 for example the track contacts 1 and 2 of subsection A, of which 1 is a warning track contact and 2 a stopping contact, and control the entrance of a train running in the down direction (indicated in the figure by the word "Down" and an arrow) into the traffic section which comprises the subsections B, C, E, and F, and similarly the track contacts 3 and 4 of subsection F control the entrance of a train running in the up direction (indicated in the figure by the word "Up" and an arrow) into the traffic section which comprises the subsections E, C, B, and A.

An example of locomotive apparatus for interacting with the apparatus shown in Fig. 3 will be described below with reference to Fig. 4, although, as is obvious apparatus such as is shown in and described with reference to Fig. 1 may be used.

When the shoe 14 (Fig. 4) interacts with a track contact, current flows from the generator 303, through a switch 304, resistance 305, to the coils of electromagnet 306, the arm 307 of a commutator switch whose position is adapted to be reversed when a locomotive is turned on a turntable triangle loop or the like the arm 308 of a reversing gear switch which is adapted to be operated by the movement of the reversing gear, wire 309, to insulated contacts 310 and 311 (which, when the box 126 is shut, are electrically connected together by means of an insulated U shaped piece 312) to the shoe 14, and thence through the track apparatus as hereinafter described returning to the generator 303, through the rails the wheels the frame of the locomotive, wire 313 wire 314, arm 315 of the reversing gear switch, arm 316 of the commutator switch and wire 317. The value of the resistance 305 is such that even should the shoe 14 short circuit to the frame the current passing through the electromagnet 306 would not be sufficient to attract its armature 318 against gravity and it may be (as shown) a spring 319. When however sufficient current from an external generator passes in the same direction as this initial current the armature 318 is attracted sufficiently to make contact with the contacts 320 and 321 and current then flows from the generator 322 through the switch 323 wire 324 to the coils of the electromagnets 52 and 53 wire 325 contact 320 armature 318 wire 313 back to the generator 322 and warning and stopping operations on the train are restrained. At the same time current flows from generator 327 by switch 328 wire 329 through electromagnet 330 and the solenoid 332 (and also through a parallel path including an electric bell 331) wire 333 contact 321 armature 318 wire 313 and back to the generator 327. The sounding of the bell 331 indicates that the line is clear and the armature 334 is attracted against the contact 335 so that the current through the said parallel path including the bell 331 is maintained through contact 335 and the wire 336 even after the armature 318 has fallen and broken contact with contact 321. The contact 422 and the contact 423 which is carried by but insulated from the armature 334 being now in contact a local circuit from generator 420 through wire 421 contacts 422 and 423 wire 424 and solenoid 425 is completed. The miniature cab signal 426 is thus lowered thus giving a visual indication that the line is clear besides the audible one given by the bell 331. The bell 331 thus continues to ring, the cab signal 426 remains lowered, and the solenoid 332 remains energized until the circuit is broken by the switch 328 which if preferred, may be of the ordinary push type and so arranged that it is normally closed and only broken when pressed. The energizing of the solenoid 332 causes the withdrawal of the catch 337, which normally locks the casing 126 in the position shown.

Figure 3:
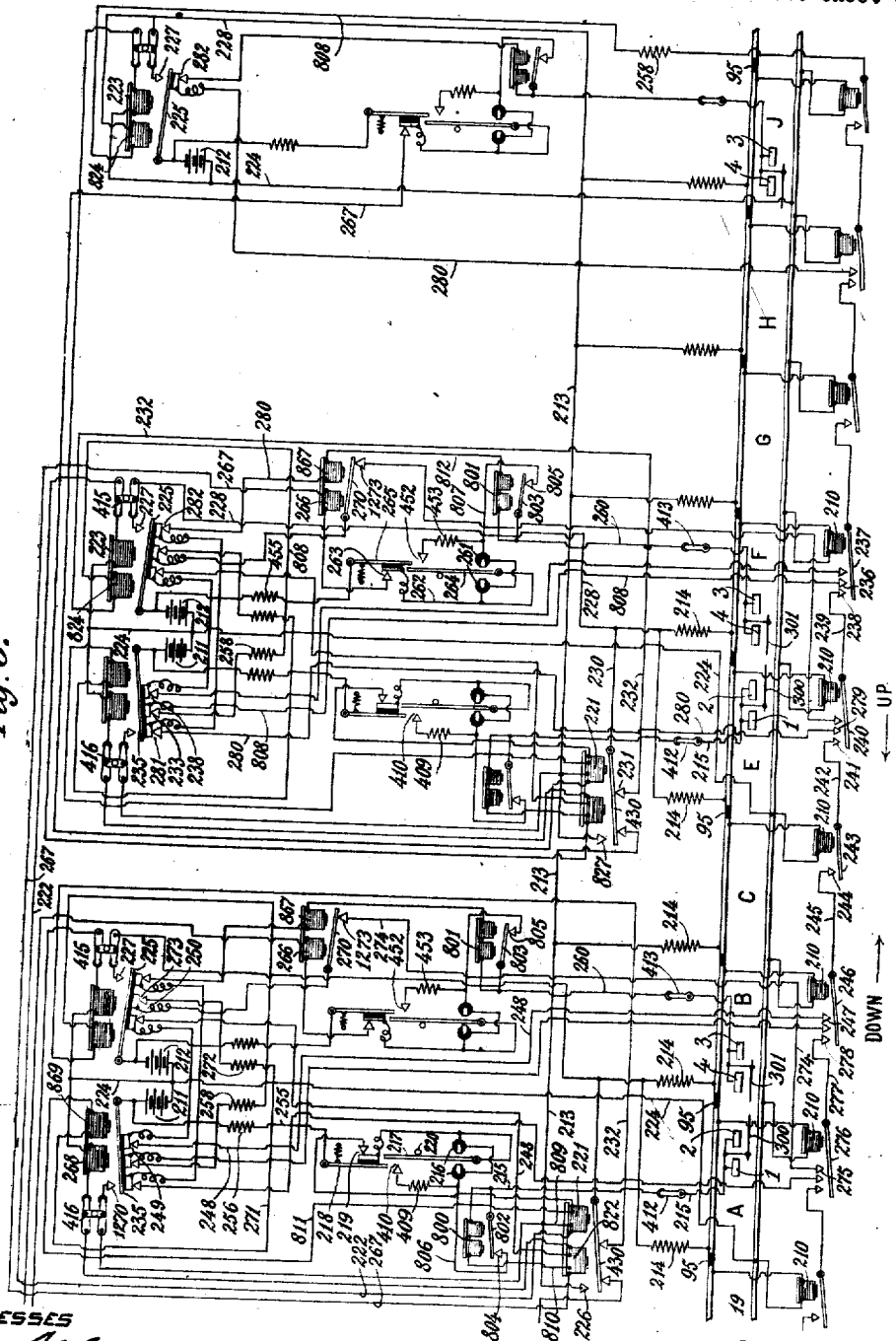
Fig. 3 is a diagrammatic representation similar to Fig. 2 of track apparatus wherein nonpolarized relays are used instead of most of the polarized relays of the example shown in Fig. 2.

For the purpose of enabling the driver of a train to ascertain whether the section ahead has become safe for the passage of the train therethrough, after a warning or a stopping operation has been performed on the train suitable wires or conductors 300 and 301 are placed on the track as shown in Fig. 3 in such a manner that a special contacting device 340 (Fig. 4) may make contact with a wire 300 and 301 at any position from the end of a warning contact which faces the said section ahead to the beginning of the section ahead. This contacting device 340 is suspended and insulated from the cab of the locomotive, and so arranged that it may be lowered into contact with the wire 300 or 301 by a suitable lever, or as shown in Fig. 4, by a suitable pedal 341 which can be depressed by the foot against springs 342 and 343. Each of the wires 300 and 301 is connected to the nearest pair of track contacts and functions as an extension of those track contacts. When the driver depresses the contacting device 340 and the section ahead is safe for the passage of the train therethrough, sufficient current will pass through the coils of the electromagnet 306 to attract the armature 318 into contact with the contacts 320 and 321, the line clear bell or buzzer 331 will sound, the miniature signal 426 will fall and the solenoid 332 being energized will remove the catch 337 from the catch 345 and thus unlock the casing 126. If the train has only been stopped between track contacts 1 and 2 or 3 and 4 the sounding of the bell 331 and the falling of the cab signal 426 will indicate permission to proceed but should the train have been automatically stopped on a track contact 2 or 4 the driver must open the casing 126 which is now unlocked by the solenoid 332 and reset the dog 99 by means of the lever 203. In opening the casing 126 the U-shaped connexion 312 between the contacts 310 and 311 is removed so that before the train can obtain clearance over the next track contact the casing must again be locked and the connexion between the contacts 310 and 311 thus reestablished as otherwise when the locomotive passes over the next track contact, the connexion of the generator 303 with the shoe 14 will not be completed. If the contacting device 14 is placed midway between the rails either the special contacting device 340 or the wires 300 and 301 must be duplicated to meet the case when the locomotive is turned on a turntable triangle loop or the like. Should for any reason the main shoe 14 not be placed midway between the rails an arrangement as shown in Fig. 6 can be employed in which a stoutly braced light duplicate shoe 350 is adapted to interact with track contacts and to lift the shaft 102 independently of the shoe 14. The wires 300 and 301 are in the example shown in the figure not duplicated so that special contacting devices 340 and 360 which are adapted to be depressed by the same pedal 361 are used. The shoe 14 duplicates shoe 350 and special contacting devices 340 and 360 are all electrically connected.

For the purpose of shutting off fluid pressure from a brake pump Z where air brakes are used on the train, the piston 117 is adapted as shown in Fig. 5, normally to allow fluid pressure to pass from the source W through ports S in the said piston 117 to the pump Z, but when moved for the purpose of applying the brakes, to close the ports S and shut off the supply of fluid pressure to the pump Z.

When a train interacts with a track contact 1 or 2 on subsection A (Fig. 3) current flows from the generator 303 (Fig. 4) on the locomotive, through the locomotive apparatus to the shoe 14 thence by wire 215 through armature 802 of electromagnet 800, contact 804, wire 806 the coils of polarized relay 216 (the armature 217 of which is adapted in the known way, as by gravity or magnetic bias or both, to remain normally out of contact with the arm 218 and the contact 410) the contacts 219 (one of which is carried by and insulated from the arm 218) to one winding of the electromagnet 221 and thence by wire 222 to the electromagnet 223 at the far end of the section, through wire 224 to the rails 19, and back to the generator 303 on the locomotive by the wheels and frame. The direction of the current through the polarized relay 216 is such as to keep the armature 217 against the insulated stop 220 and out of contact with the arm 218 and the contact 410.

Owing to the energization of the electromagnet 221 and the electromagnet 223 at the far end of the section the armatures 430 and 225 are moved against the contacts 226 and 227 and a negative current then flows from the generator 212 at the far end of the section through the armature 225 contact 227 wire 228 wire 230 armature 430 pertaining to the far end of the section wire 213 through the resistances 214 of all the subsections A, B, C, E, and F (to those of A and B by way of contact 226 and adjacent armature 430) to the track relays 210 of the subsections A, B, C, E, and F and returns to the generator 212 through the wire 224. Since the train is standing in subsection A the track relay 210 of that subsection does not attract its armature 276 but those of subsections B, C, E, and F if they are unoccupied and their rails and necessary connexions are unbroken attract their respective armatures and current then flows from the generator 212 through the completed parallel path comprising contact 231 shown adjacent to subsection E wire 232 electromagnet 824 wire 808 resistance 258 contacts 233 (one of which is carried by and insulated from armature 235) wire 808 contact 236 armature 237 of the track relay 210 of subsection F contact 238 wire 239 armature 240 of relay 210 of subsection E contact 241 wire 242 armature 243 of relay 210 of subsection C contact 244 wire 245 armature 246 of relay 210 of subsection B contact 247 the portions of wire 248 which are connected through contacts 249 (one of which is carried by and insulated from armature 235) and through contacts 250 (one of which is carried by and insulated from armature 225) one winding of the electromagnet 822 wire 810 the electromagnet 800 to the wire 215. The electromagnet 800 being energized lifts the armature 802 from the contact 804 and thus breaks the circuit comprising the coils of the polarized relay 216 the electromagnet 221 and the electromagnet 223. Since however the electromagnets 822 and 824 are energized at the same time as the electromagnet 800 the armatures 430 and 225 remain in contact with the contacts 226 and 227 respectively. The value of the current then flowing is governed by the value of the resistance 258 and its direction through the electromagnet 306 on the locomotive is the same as the small current which initially flowed from the generator 303. This initial current was not strong enough to move the armature 318 (Fig 4) against the contacts 320 and 321 but the resultant current which passes in the same direction as the initial current through the electromagnet 306 lifts the armature 318 into contact with contacts 320 and 321 and so causes the completion of the circuit for restraining warning and stopping operations and the circuit for ringing the line clear bell or buzzer 331 and energizing the solenoid 332. Had any of the subsections B, C, E, and F, been occupied by any vehicle or had any of their rails or necessary connexions been broken this complementary current from the generator 212 at the far end of the traffic section would not have flowed through the coils of the electromagnet 306 and the train would have been warned by track contact 1 and stopped by track contact 2.

When a train running on the up journey interacts with these track contacts 2 and 1 of subsection A the current from generator 303 initially flows through the shoe 14 and along the same path as when the train travelling in the opposite direction is in contact with the same track contact but owing to the fact that the connexion of the generator 303 to the shoe is reversed the current flows in the opposite direction through the coils of the relay 216 and the armature 217 is consequently moved over against the arm 218 and the contact 410 thus separating the contacts 219. The current is thus caused to flow from the coils of the relay 216 through the armature 217 the arm 218 wire 255 resistance 256 to the positive pole of generator 211 and wire 224 to the rails 19 and back to the generator 303 by the wheels and frame of the locomotive. The value of the resistance 256 is such that sufficient current now passes from the generator 211 through the coils of the electromagnet 306 on the locomotive, the generators 211 and 303 acting in conjunction and the train is thus allowed to obtain clearance over the track contacts 2 and 1.

The whole of this current will not pass through the coils 216 as these are shunted by resistance 409 when the armature 217 contacts with the contact 410.

When the train is running on the up journey and interacts with the warning track contact 3 or the stopping track contact 4 of the subsection F the negative pole of the generator 303 is connected to the shoe 14 and negative current flows from the generator 303 through the shoe 14 to the track contacts 3 or 4 thence by wire 260 through armature 803 of electromagnet 801 contact 805 wire 807 the coils of polarized relay 261 (whose armature 264 is in its normal position against an insulated stop and out of contact with the arm 265 and contact 452 and is not moved from that position by the current owing to the direction of the current through the relay 261), wire 262, contacts 263 (one of which is carried by and insulated from the arm 265) electromagnet 266, wire 267, to the electromagnet 822 at the far end of the section (the magnet 822 has two windings and the current now passes through the winding not traversed by current when a train travelling on the down journey interacts with a track contact 1 or 2 in subsection A), the electromagnet 268, wire 224, to the rails 19, and thence back to the generator 303 through the wheels and frame of the locomotive. The adjacent armature 270 and the armatures 430 and 235 of the far end of the section are thus attracted, and current flows from the positive pole of the generator 211 at the far end of the section, through armature 235 contact 1270, to the main line wire 213 and through the resistances 214 of all the subsections A, B, C, E, and F, (to those of A and B by way of contact 226 and the armature 430 at the far end of the section) to the track relays 210 of the subsections A, B, C, E, and F, and returns to the negative pole through the wire 224. Since the train is standing in subsection F the track relay 210 of that subsection does not attract its armature 237 but those of the subsections E, C, B, and A if they are unoccupied and their rails and necessary connexions are unbroken attract their respective armatures and current then flows from the battery 211 through the completed parallel path comprising the wire 809 electromagnet 221 (the magnet 221 has two windings and the current now passes through the winding not traversed by current when a train travelling on the down journey interacts with a track contact 1 or 2 of subsection A), wire 811 electromagnet 869 wire 271 resistance 272 contacts 273 (one of which is carried by and insulated from the armature 225) armature 270 contact 1273 wire 274 contact 275 armature 276 of relay 210 of subsection A wire 277 contact 278 armature 246 of relay 210 of subsection B wire 245 contact 244 armature 243 of relay 210 of subsection C wire 242 contact 241 armature 240 of relay 210 of subsection E contact 279 and the portions of the wire 280 which are connected through contacts 281 (one of which is carried by and insulated from the armature 235) and contacts 282 (one of which is carried by and insulated from the armature 225) the electromagnet 867 wire 812 electromagnet 801 to the wire 260. The electromagnet 801 being energized lifts the armature 803 from the contact 805 and thus breaks the circuit comprising the coils of the polarized relay 261 and the electromagnets 266, 822 and 268. Since however the electromagnets 867, 221 and 869 are energized at the same time as the electromagnet 801 the armature 270 adjacent to F remains out of contact with contact 1273 and the armatures 430 and 235 remain in contact with contacts 226 and 1270 respectively.

The value of the current flowing is governed by the resistance 272 and its direction through the coils of the electromagnet 306 on the locomotive is the same as that of the small current which initially flowed from the generator 303. This initial current was not strong enough to move the armature 318 (Fig. 4) against the contacts 320 and 321, but the resultant current which passes in the same direction as the initial current through the coils of the electromagnet 306 lifts the armature 318 into contact with contacts 320 and 321 and so causes the completion of the circuit for restraining warning and stopping operations, and the circuit for ringing the line clear bell or buzzer 331 and energizing the solenoid 332. Had any of the subsections E, C, B, or A been occupied by any vehicle or had any of their rails or necessary connexions been broken, this complementary current from the generator 211 at the far end of the traffic section would not have flowed through the coil of the electromagnet 306 and the train would have been warned by track contact 3 and stopped by track contact 4.

When a train running on the down journey interacts with the track contacts 4 and 3 of subsection F it is only necessary for it to obtain clearance over them. The current from the generator 303 initially flows through the shoe 14 and along the same path as when the train travelling in the opposite direction is in contact with the same track contact 3 or 4, but owing to the fact that the connexion of the generator 303 to the shoe is reversed, current flows in the opposite direction through the coils of the relay 261, and the armature 264 is consequently moved over against the arm 265 and the contact 452 thus separating the contacts 263. The current is thus caused to flow from the coils of the relay 261 through the armature 264 the arm 265 and resistance 455 to the negative pole of the battery 212 and wire 224 to the rails 19 and back to the generator 303 on the locomotive. The value of the resistance 455 is such that sufficient current now passes from the generator 212 through the coils of the electromagnet 306 on the locomotive the generators 212 and 303 acting in conjunction and the train is thus allowed to obtain clearance over the track contacts 4 and 3.

The whole of this current does not pass through the coils of the polarized relay 261 as these are shunted by resistance 453 when the armature 264 makes contact with the contact 452.

Switches 415 and 416 may be inserted in the connexions to the relays 223 and 268 which by breaking these connexions prevent these relays from being energized and switching into circuit the generators 211 and 212 so that the disconnexion of the relay 223 shown adjacent to subsection F prevents the passage of trains through subsection A and the disconnexion of the relay 268 shown adjacent to subsection A prevents the passage of trains through subsection F. The passage of trains over subsection B or E or any other subsection containing track contacts may be similarly prevented. There may also be inserted in the connexions 215 and 280 of the track contacts switches 412 and 413 which on breaking these connexions will prevent trains from obtaining clearance over the corresponding track contacts 1 and 2 and 3 and 4 respectively.

The railway track shown in Fig. 3 ends on the righthand side of the figure with subsection J as the final subsection and is shown as continuing indefinitely in the other direction. Consequently there is no need of track contacts on the subsection H, and the apparatus corresponding to the subsection J is simplified as compared with the apparatus corresponding to subsection F in that the parallel path including the wire 808 and the resistance 258 and the armatures of the track relays 210 is permanently connected to the magnet 824 and to the wire 228 close to the contacts 227, the wire 228 is permanently connected to the relays 210 of subsections G, H, and J, and the wire 280 is permanently connected to the insulated contact 282 carried by the armature 225, there being omitted electromagnets such as the magnets 268 and 869 for breaking the parallel path in question including the wire 808 in the case of the other subsections, and their connections, electromagnets such as the magnets 221 and 822 for breaking the connection between the wires 808 and 228 in the case of the other subsections, and their connections, and electromagnets such as the magnets 266 and 867 adapted in other subsections to break the connection of the corresponding electromagnet 869 with the armature of the corresponding track relay 210.

The rails are bonded beyond the warning contact 3 on subsection J and the insulating joint 95 is placed so that a locomotive running on the up journey will have to pass over it before interacting with the warning track contact 3 on subsection J.

Where it is desired that trains should run in only one direction along the railway track the track may be equipped with apparatus such as that shown in Fig. 8 or 9, the locomotive apparatus being simplified as shown diagrammatically in Fig. 7.

Fig. 8 shows a length of track, the rails 19 constituting one side of which are electrically bonded together from end to end of the track, and the rails constituting the other side are separated into suitable subsections by insulating joints 95. Four of these subsections are shown as constituting a main or traffic section the entrance into which is controlled by track contacts 1 and 2. Each subsection has a track relay 360 the energizing of which by its own track generator 377 is effected on the energization of a quick acting electromagnet 371 by the attraction of the armature 376 into contact with contact 379. When a train equipped with the apparatus shown in Fig. 7 interacts with track contact 1 or 2 current passes from the generator 370 through all the electromagnets 371 (which are arranged in series) wire 372 track contact 1 or 2 the shoe 14 (Fig. 7), wire 373, bell 374, and the electromagnets 52 and 53, returning to the generator 370 by the frame, the wheels, the rails 19 and the wire 375. This current is not strong enough to ring the bell 374 or restrain the warning and stopping operations on the locomotive. The armatures 376 are thus moved and complete the circuits of the relays 380 of the individual subsections the current then flowing in the case of each subsection from generator 377 through resistance 378 contact 379 armature 376 the electrically continuous rails between the insulating joints 95 of the subsection the track relay 380 the rails 19 and wire 381. If all these subsections are unoccupied and their rails and necessary connexions are unbroken the track relays 380 move their individual armatures 382 against the contacts 386 and current from the generator 370 flows through a parallel path comprising the regulating resistance 387 and the main line wire 384 by way of the contacts 386 and armatures 382 of the track relays 380. The resultant current which passes through the apparatus on the locomotive is now owing to the reduction of the resistance of the track portion of the circuit to the flow of current through the apparatus on the train sufficient to ring the bell 374 (Fig. 7) and by means of the controlling devices 52, 53 to restrain the warning and stopping operations but should any of the subsections have been occupied by any vehicle, or had any of their rails or necessary connexions been broken, the aforesaid parallel path would have not been completed and the current through the apparatus on the locomotive would have been too small to restrain the production of a warning operation by track contact 1 and a stopping operation by track contact 2.

Fig. 9 shows a traffic section comprising four subsections, each of which has a track relay 380 through which current can flow from a generator 392 common to the four subsections through a main line wire 390 and a suitable resistance 391. When a train interacts with a track contact 1 or 2, current flows from the generator 392, through the coils of electromagnet 393, wire 394, the track contact 1 or 2, the apparatus on the locomotive (Fig. 7) the rails 19, and wire 395. The armature 396 is moved against the contacts 397, and current then flows from generator 392, through contact 397, armature 396, to the main line wire 390, each of the resistances 391, the electrically continuous rails between the insulating joints 95 of each subsection, and the track relays 380, and returns by the rails 19 and wire 395. If the subsections are unoccupied and their rails and necessary connexions are unbroken, the track relays 280 are energized and move their armatures 382 against contacts 386, and current from the generator 392 flows through a parallel path comprising resistance 398 and the contacts 386 and armatures 382 of the track relays 380. The resultant current which passes through the apparatus on the locomotive is now sufficient to ring the bell 374 (Fig. 7) and to restrain the warning and stopping operations, but should any of the subsections have been occupied by any vehicle or had any of their rails or necessary connexions been broken the aforesaid parallel path would not have been completed and the current through the apparatus on the locomotive would consequently not have been sufficient to restrain the production of a warning operation by track contact 1 and a stopping operation by tract contact 2.

As in the case of the apparatus shown in Figs. 2 and 3, the track contacts 1 and 2 can in the case of the apparatus shown in Figs. 8 and 9 be disconnected from the rails by means of a switch in wire 372 (Fig. 8) or wire 394 (Fig. 9) so that a signalman is enabled to prevent the passage of a train over the track contacts 1 and 2 independently of the condition of the section ahead of the train.

Figs. 10, 11, and 12 show an arrangement for preventing a hanging chain or coupling hook from catching or displacing a track contact. Chairs 504 support a timber baulk 505 to which is fixed the steel track contact 506 of T shaped cross section. The chairs 594 hold the baulk 505 securely in its place by a suitable bolt 507, and the nut or head 508 of this bolt and also the head of each wood screw 509, which secures the corresponding chair to the sleeper 519, are protected from hanging chains by suitable inclined flanges or cheeks 511 of the corresponding chair 504 (shown in perspective in Fig. 12) over which a chair or coupling hook will glide gently. As a further protection the recess formed by the flanges is covered as shown in Fig. 12 by a sheet iron covering 864 which is bent so that its top surface is flush with the edges of the flanges. The track contact 506 rests on suitable insulating blocks 513 and is connected to the timber baulk by wood screws the heads of which 512 are protected by suitable sheet iron coverings 514 which are secured to the timber baulk by screws 516 and are ramped at their ends (Figs. 10 and 11). It is intended that all nuts and heads of bolts and screws, which might otherwise be liable to be caught by a hanging chain or coupling hook should be protected as shown in Figs. 10, 11 and 12.

The end of the track contact 506 is also protected from injury by a suitable nose 517 of the shape shown in Fig. 11 resting on adjacent sleepers 518 and 519. The extreme end 520 of the shoe 517 is brought down to the level of and preferably a little below the top of the sleeper 518.

A hanging coupling hook or chain is thus unable to foul the end of the steel track contact 506 or to catch in the heads of the wood screws 512 or the bolts 508 and 509.

Fig. 13 shows a means whereby a train is rendered incapable of passing over trailing and facing points unless they are safely home and duly locked in position. A train running on the down journey (indicated by the word "Down" and an arrow) before arriving at the points interacts with the track contact 521 which is preferably, and is hereinafter assumed to be a stopping contact although it might be a warning contact. The points may be set for either the main line L or the branch line T and if they are correctly home and duly locked a current will flow from the generator 303 (Fig. 4) through the apparatus on the locomotive to the shoe 14 track contact 521 wire 522 the insulated point detectors 523 and 524 if the main line is made as shown, or the insulated point detectors 525 and 526 if the branch line T is made, to wire 527, the contacts 528 (one of which is carried by and insulated from the locking bar 529 and which are in contact if the locking bar 529 is securely home) wire 530 to the coils of polarized relay 531 wire 542 insulated contacts 533 and 534, wire 543 to the rail and back to the generator 303 on the locomotive through the wheels and frame. The armature 532 of this relay is adapted to remain normally in a middle position as shown and when it is in this position contact is made between the two insulated contacts 533 and 534.

When the armature 532 is moved to either side it brings its insulated contacts 536 and 537 to which the poles of the generator 535 are respectively connected, into contact with either the spring contacts 540 and 541 respectively or with the spring contacts 538 and 539 respectively and then moves one of the insulated contacts 533 and 534 thus breaking contact between them. The direction of the current through the coils 531 when the train interacts with the track contact 521 on the down journey is such that the armature 532 is moved to the right so as to bring its insulated contacts 536 and 537 into contact with the spring contacts 540 and 541 respectively and thus to connect the negative pole of the generator 535 to the contact 540 and the positive pole to the contact 541, and then to break contact between the contacts 533 and 534. The generator 303 on the locomotive and the generator 535 on the track are now connected in series and current flows through a circuit comprising the generator 303 (Fig. 4) the apparatus on the locomotive the shoe 14 track contact 521 wire 522 the point detectors 523 and 524 or 525 and 526 wire 527 the locking bar contacts 528 wire 530 coils of polarized relay 531 wire 542 contact 540 contact 536 the generator 535 contact 537 contact 541 wire 544 wire 543 the rails and the wheels and frame of the locomotive. The resultant current is strong enough to attract the armature 318 (Fig. 4) into contact with contacts 320 and 321 so that warning and stopping operations are restrained and a line clear indication is given.

The whole of this current does not pass through the coils 531 since when the armature 532 moves over to the right these coils 531 are paralleled by the wire 546 resistance 547 contacts 548 (one of which is carried by and insulated from the armature 532) and wire 549.

The train thus tests the condition of the facing points and should these points not be completely home and duly locked or should any of the necessary connexions be broken or the armature 532 be wrongly placed the circuit through the track contact 521 would be broken at either the point detectors or the locking bar contacts and the train would be stopped on the stopping track contact 521.

When the locomotive runs on the up journey the connexion of the generator 303 to the shoe 14 is reversed and when the train is in contact with the track contact 521 current flows through the coils of the polarized relay 531 and moves the armature to the left, which brings its contacts 536 and 537 into contact with the spring contacts 538 and 539 respectively and then breaks contact between the contacts 533 and 534. The generator 535 is thus as before switched into circuit but in the reverse direction and sufficient current will thus flow through the locomotive apparatus to attract the armature 318 and restrain the warning and stopping operations. The coils 531 in this case are paralleled by the path comprising wire 550, resistance 560 contacts 561 (one of which is carried by and insulated from the armature 532) and wire 562.

When a train runs on the up journey (indicated by the word "Up" and an arrow) and interacts with the track contact 564 which is preferably a stop contact, it is essential that the points should be in the position shown. The wire 565 is therefore threaded through insulated point detectors 566 and 567 and joins wire 527. The current then passes to the wire 527, and through the remainder of the circuit as described above, and the train is warned and stopped on track contact 564 if the points are not set for the main line or the locking bar contacts 528 are not closed, or any of the necessary connexions broken or the armature 532 wrongly placed.

Similarly when a train runs on the up journey on the branch line T towards the points, it tests whether they are set to make the road for the branch line and on interacting with track contact 569 (which is preferably a stop contact, current flows through wire 570 threaded through the point detectors 571 and 572, thence to wire 527 and through the remainder of the circuit as described above. Should the points not be correctly set for the branch line or should the locking bar contacts 528 not be closed or should any of the necessary connexions be broken or the armature 532 be wrongly placed or all not be in order the train would be stopped on track contact 569 otherwise the operations described above would be performed when the train interacts with track contact 569 and the train would obtain clearance.

The track contacts 521, 564, and 569 may if desired have a warning track contact connected with them so as to warn a train first before stopping it should the points not be safely home.

The track contacts 521, 564 and 569 should each be placed at such a distance from the points that a train may be automatically stopped after interacting with any of the said track contacts before it arrives at the points.

When it is intended that trains are to run in one direction only it is unnecessary to employ any relay at points as the electrical connexions may be such that a circuit through a generator such as 535 will be closed by a train when in contact with a track contact on approaching the points only when the points are correspondingly home and locked.

When a locomotive changes its direction of running by means of a turntable triangle loop or the like the reversing gear is not operated. It is therefore necessary in order to ensure the proper interaction with the track apparatus that the commutator switch or switches hereinbefore mentioned should be moved over to reverse the connexions of the generator on the locomotive with the contacting shoe. Fig. 14 illustrates means whereby the driver is compelled to operate the commutator switch or switches before the locomotive enters a loop. Similar apparatus is used in connexion with a turntable triangle or the like.

Two stop track contacts 700 and 701 are placed on the track before the entrance into the loop, the contact 701 being close to the said entrance. In the case represented by Fig. 14 where the loop changes the direction of running of a locomotive from the down journey to the up journey the track contact 700 is connected to the nearest main line track contacts 1 and 2 (Fig. 2 or 3). A locomotive on the down journey (indicated by the word "Down" and an arrow) makes contact with the track contact 700 with its shoe through which current travels to track apparatus connected through the locomotive apparatus to the positive pole of the generator on the locomotive. After passing over the track contact 700 and before interacting with track contact 701 the driver must operate the commutator switch or switches so as to connect the said shoe to the negative pole of the generator on the train. If when the locomotive interacts with track contact 701 the driver has already operated the commutator switch or switches the generator 703 on the track is connected in series with the generator of the locomotive its positive pole being connected with track contact 701 by means of wire 704 and its negative pole with the rails by means of a regulating resistance 705 and wire 706. The current which flows through the apparatus on the locomotive is thus of sufficient value to cause the restraint of warning and stopping operations and the locomotive is able to run round the loop.

When the locomotive leaves the loop and again interacts with track contact 701 the generator on the locomotive and the track generator 703 are again in series, and the locomotive therefore obtains clearance, and also obtains clearance on interacting with track contact 700. If however, the driver has not operated his commutator switch or switches before the locomotive interacted with track contact 701, the locomotive on interacting therewith would have had its generator connected in opposition to the generator 703 on the track and sufficient current would not have flowed through the locomotive apparatus to restrain warning and stopping operations and the train would consequently have been stopped by the said track contact.

In cases where the loop or the like changes the direction of running of a locomotive from the up journey to the down journey similar means for compelling the driver to operate his commutator switch or switches are used, the track contact 700 being in these cases connected to the nearest main line track contacts 3 and 4 (Fig. 2 or 3) whereby a train on the up journey tests the condition of the track ahead thereof and the connections of the generator 703 to the track contact 701 and to the rails are reversed.

In the case of every example of train apparatus hereinbefore described, it is essential that the arrangement should be such that a train should be able to complete a switching operation from a track contact and thus to receive a restraining current of adequate strength before the restraint of the shaft 102 is removed from the dog 98 and thus before its restraint is removed from the dog 99, as otherwise the train would be warned or stopped before it had tested the railway track; this is effected by providing the track contacts with sufficiently long ramped end portions by which the raising is done and by using track instruments of correspondingly suitable sensitivity.

When it is desired to use this invention in connexion with trains driven by electrical power the running rails may be used in the manner hereinbefore described for the protection of trains and the electric motive power may be supplied to the trains in the known way the running rails constituting one side of the track being used as a common return for the power and for the current used by trains for their protection and the running rails constituting the other side of the track being divided by insulating joints into insulated lengths as hereinbefore described. Instead of a common return for the power and for the current used by trains for their protection a separate return may be used for the power. The train portion of the circuit of the motive power current is in each case so threaded that it is broken on the movement of some moving part such as a dog 99 a stopping operation being then produced on the train.

It will be seen that by means of the arrangements illustrated by Figs. 2, 3, 8 and 9 it is possible to enable a train on entering a section very much longer than has heretofore been practicable where reliance is placed on the short circuiting of a track relay by an occupying vehicle to test the safety of the section by means of a single track contact. This is achieved by the use of subsections each of which is provided with its own track relay and by so arranging that the short circuiting of any one track relay will influence the flow of current through apparatus on a train in contact with the track contact at the end of the section. In all cases the shortcircuiting results in an insufficiency of current.

What I claim and desire to secure by Letters Patent of the United States is:—

1. Train protecting apparatus comprising on a train a danger-indicating device, restraining means for restraining the operation of said danger-indicating device, a liberating device adapted when operated to remove the restraint of said restraining means, electrical substitutional restraining means adapted to be energized when said liberating device is operated and on flow of adequate current therethrough to restrain the operation of said danger-indicating device, and a train current path through said substitional restraining means, and on the track, a track contact for operating said liberating device, a first track current path including a generator of electricity and an electromagnetic testing device, electrical circuit closing means adapted when energized to close said first track current path, a second track current path adapted when the train is in contact with said track contact to form with said train current path a closed circuit adapted to deliver to said circuit closing means on the track current sufficient for operating said circuit closing means but insufficient for restraining the operation of said danger-indicating device, said electromagnetic testing device being adapted to effect an increase of said insufficient current to a current adequate for effecting the restraint of the operation of said danger-indicating device and not to effect said increase when short-circuited by a vehicle on the track.

2. Train protecting apparatus comprising on a train a danger-indicating device, restraining means for restraining the operation of said danger-indicating device, a liberating device adapted when operated to remove the restraint of said restraining means, electrical substitutional restraining means adapted to be energized when said liberating device is operated and then to restrain the operation of said danger-indicating device, and a train current path through said substitutional restraining means, and on the track, a track contact for operating said liberating device, a track circuit including a generator of electricity and a testing electromagnetic device, a shunt current path from said generator of electricity which is in parallel with said track circuit and which is adapted when the train is in contact with said track contact to form with said train current path a closed circuit adapted to deliver from said generator of electricity to said substitutional restraining means current for effecting the restraint of the operation of said danger-indicating device, said electromagnetic testing device being adapted when short-circuited by a vehicle on the track to break said shunt current path.

3. Train protecting apparatus comprising on a locomotive a danger-indicating device, restraining means for restraining the operation of said danger-indicating device, liberating means for removing the restraint of said restraining means, electrical substitutional restraining means adapted to be energized when the restraint of the first mentioned restraining means is removed, a locomotive current path including said substitutional restraining means, and a switch for reversing the connexions of said locomotive current path according to the direction of facing of said locomotive, and on the track means for compelling the driver to operate said switch so as to reverse said connexions before the direction of running of said locomotive is reversed by a turntable, triangle, loop, or the like comprising near said turntable, triangle, loop, or the like, a track contact for causing said liberating means to remove the restraint of the first mentioned restraining means, and a current path including a generator of electricity and connected on the one hand to said track contact and on the other hand to rails of the track, and adapted to co-operate with said train current path to effect the restraint of the operation of said danger-indicating device when the locomotive is in contact with said track contact and only when the connexions of said train current path are such as to enable said generator of electricity to effect the restraint of the operation of said indicating device.

4. Train protecting apparatus comprising a train-stopping device on a train, means on said train for preventing the driver from resetting said train-stopping device after the operation thereof, an electromagnetic unlocking device adapted when energized to unlock said means and so allow the driver to have access to said train-stopping device, and means for energizing said electromagnetic unlocking device when safe traffic conditions prevail.

5. Train protecting apparatus comprising a danger-indicating device on a train, restraining means on said train for restraining the operation of said danger-indicating device, a liberating device located on said train and adapted when operated to remove the restraint of said restraining means, electrical substitutional restraining means located on said train and adapted when in a proper condition as to electricification to restrain the operation of said danger-indicating device, a train current path through said substitutional restraining means, and means for reversing the connexions of said current path according to the direction of travel of the train, and for a section of track, a track contact for operating said liberating device, a traffic controlling device connected to the rails of said section and adapted to cause said substitutional restraining means on the train to be in said proper condition as to electrification when the train is in contact with said track contact and not to secure said proper condition as to electrification when it is short circuited by a vehicle in said track section, a track current path including a polarized relay and adapted when the train is in contact with said track contact to form with said train current path a closed circuit adapted to deliver to said polarized relay current in one direction or the opposite direction according to the state of said train current path connexions and consequently according to the direction of running of said train, said polarized relay being adapted to be caused by the direction of current sent therethrough when the train is traveling in one direction and is approaching said section of track to cause the electrification of said substitutional restraining means to be influenced by said traffic-controlling device and by the direction of current sent therethrough when the train is travelling in the opposite direction and is leaving said section of track to cause said substitutional restraining means to be in said proper condition as to electrification independently of the condition of said section of track.

6. Train protecting apparatus comprising a danger-indicating device on a train, restraining means on said train for restraining the operation of said danger-indicating device, a liberating device located on said train and adapted when operated to remove the restraint of said restraining means, electrical substitutional restraining means located on said train and adapted when in a proper condition as to electrification to restrain the operation of said danger-indicating device, a train current path through said substitutional restraining means, and means for reversing the connexions of said current path according to the direction of travel of the train, and for a section of track, a track contact for operating said liberating device, a controlling track relay connected to the rails of said track section and adapted when current passes therethrough on contact of the train with said track contact to cause said substitutional means on the train to be in said proper condition as to electrification and not to secure said proper condition as to electrification when it is short-circuited by a vehicle in said track section, a track current path including a polarized relay and adapted when the train is in contact with said track contact to form with said train current path a closed circuit adapted to deliver to said polarized relay current in one direction or the opposite direction according to the state of said train current path connexions and consequently according to the direction of running of the train, the armature of said polarized relay being adapted to be caused by the direction of current sent through said polarized relay when the train is travelling in one direction and is approaching said section of track to be so placed as to cause current to pass through said controlling track relay which is thus caused to control the condition as to electrification of said substitutional restraining means, and by the direction of current sent through said polarized relay when the train is travelling in the opposite direction and is leaving said section of track to be so placed as to cause said substitutional restraining means to be in said proper condition as to electrification independently of the condition of said section of track.

7. Train protecting apparatus comprising a train-stopping device on a train, means on said train for preventing the driver from resetting said train-stopping device after the operation thereof, a track contact, and means for giving a danger indication on contact of said train with said track contact if the first mentioned means be not in normal position.

ARTHUR REGINALD ANGUS.

Witnesses:
GEO. C. CORSELLIS,
PERCIVAL D. BUTCHER.